Patented Apr. 8, 1941

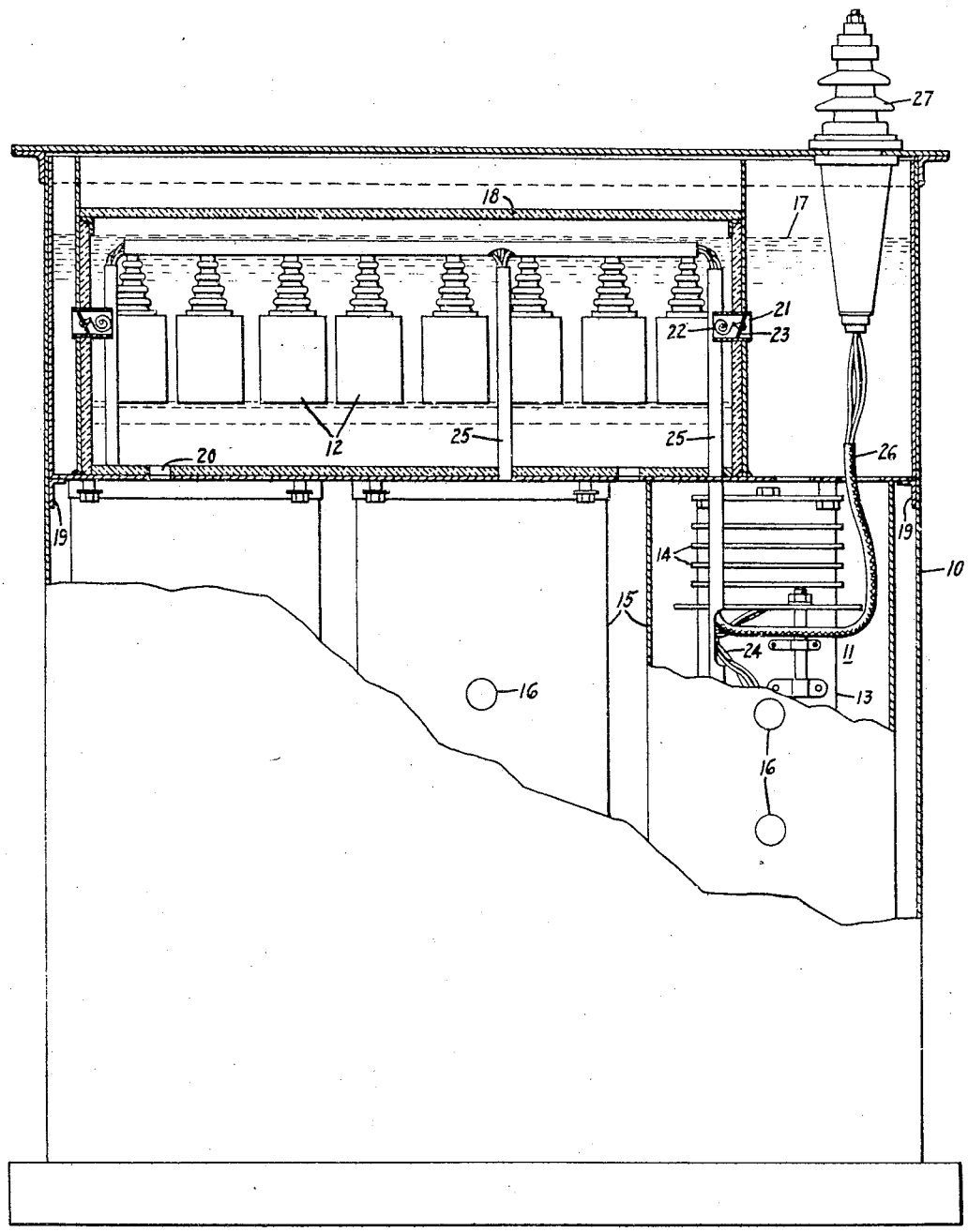

2,237,814

UNITED STATES PATENT OFFICE 2,237,814

ELECTRICAL APPARATUS

Levin W. Foster, Pittsfield, Mass., assignor to General Electric Company, a corporation of New York Application June 22, 1940, Serial No. 341,914

5 Claims. (Cl. 171—242)

My invention relates to electrical apparatus and, although not limited thereto, has particular application to a shunt having an electric induction device, such as a reactor and a capacitor.

Heretofore resonant shunts, which have particular application in outdoor installations, have employed capacitors whose characteristics do not vary appreciably over the range of temperature to which the device will be subjected. It happens, however, that the capacitor whose characteristics will not vary with changes in temperature may not be so efficient as another whose characteristics do vary with changes in temperature.

It is, therefore, an object of my invention to provide an electrical apparatus with a capacitor which has a relatively high efficiency over a predetermined operating range and further to provide an improved arrangement for maintaining the temperature of the capacitor within this predetermined operating range.

Another object of my invention is to provide a resonant shunt which is particularly adaptable for outdoor installation with an efficient capacitor and further to provide an improved arrangement for maintaining the temperature of the capacitor above a predetermined value.

I accomplish these, as well as other objects, by providing a resonant shunt with a capacitor mounted in a thermally insulated box which is adjacent an electric induction device or reactor to which the capacitor is electrically connected. The reactor and thermally insulated box or casing are in turn enclosed in a suitable housing, and an insulating fluid, such as oil, is contained in the housing and around the box and reactor. This insulating fluid acts as a dielectric for the reactor, and the temperature within the box is suitably controlled by regulating the rate of circulation of the oil through the thermally insulated box. In order to accomplish this, holes are suitably placed in the box, the openings of certain ones being controlled by a temperature regulating arrangement. Thus, during cold weather the openings will be closed and the losses from the capacitor will heat the same so that its temperature may be kept above the desired minimum value. During hot weather, however, the thermally controlled openings will allow free circulation of the liquid dielectric or cooling medium. Thus, the temperature inside the thermally insulated box may be kept within a predetermined range.

Further objects and advantages of my invention will become apparent from the following description referring to the accompanying drawing, and the features of novelty which characterize my invention will be pointed out with particularity in the claims annexed to and forming a part of this specification.

In the drawing, the single figure is a side elevation in partial section illustrating an electrical apparatus which is provided with an embodiment of my invention.

Referring to the drawing, I have illustrated a resonant shunt which has particular application for outdoor installation, such as being connected in a high voltage transmission line, the shunt having a housing 10 in which are placed any suitable number of reactors 11 and capacitors 12. The reactors 11 are of the conventional type having a supporting insulating cylinder 13 and windings 14. The reactors may be surrounded by sleeve members 15 which in turn form a magnetic shield for the reactor. The sleeve members 15 are provided with a suitable number of holes 16 so that when an insulating fluid, such as oil, is placed inside the casing 10 up to the level 17, it will surround the reactor windings and act as a dielectric therefor.

In order to provide a resonant shunt which is as efficient as possible, I employ for the capacitors 12, one which has a dielectric of a high value, such as chlorinated diphenyl, commonly known as Pyranol, this being described in United States Patent 2,041,594, Clark, which is assigned to the same assignee as the present invention. I have found that when employing capacitor units such as described in the Clark patent I am able to reduce the number of capacitors required for a resonant shunt, suitable for outdoor high voltage installation, by 30 per cent and I am able to reduce the physical size of the resultant resonant shunt by approximately 25 per cent, over a resonant shunt which employs the conventional oil capacitor. However, when capacitors of the type of the Clark patent are employed in outdoor installations, that is, where the ambient temperature may vary from 50° C. to —25° C., a marked decrease in capacitance will take place at a particular value of temperature, which is about 0° C. Apparently at this critical temperature a partial or complete solidification of the impregnant may occur, thus causing a reduction or loss in the electric capacity. Such a result would, of course, be intolerable in a resonant shunt, and so to overcome this difficulty, I provide an improved arrangement for maintaining the temperature of the capacitor units employed within a predetermined operating range or above a certain minimum value of temperature. This is accomplished by placing capacitor units 12 in a thermally insulated box or casing 18 which is placed at the top of the housing 10 and may be supported in any suitable manner such as by brackets 19, which are supported at the proper place by the side-walls of the housing 10. The capacitor units 12 inside the thermally insulated box 18 are surrounded by the fluid which is the dielectric for the reactors. This is accomplished by providing any suitable number of holes 20 in the bottom of the box, and holes 21 in the side-walls thereof, which are below the level of the oil in the housing 10. In order to control the rate at which the oil may circulate through the passageways 20 and 21, I provide a temperature responsive arrangement 22 for controlling a valve 23 in the hole 21. Any suitable number of these thermostatically controlled valves may, of course, be employed. The thermostatic arrangement 22 is placed inside the thermally insulated box 18 so as to be responsive to the temperature therein. Thus, the losses of the capacitor units 12 will heat the oil in the box 18 until a certain temperature is reached, at which time the thermostatic units 21 will cause the valve arrangements to open so as to allow the heated oil to pass out therethrough and to allow cooler oil to pass through the holes 20. With this arrangement I have found it possible to maintain the temperature during the winter months, inside the thermally insulated box 18, above the critical value so that the characteristics of the Pyranol capacitors will remain substantially constant. During the summer months, of course, when the ambient temperature is considerably higher, the circulation of the reactor dielectric will take away the heat due to the losses in the capacitors.

The reactors 11 and capacitors 12 may be connected together in any suitable manner, such as by connectors 24 which are placed inside of tubes 25. The resonant shunt may also be connected to the line through a cable 26 and bushing 27. Any suitable number of cables and bushings may be used, three being necessary for the shunt illustrated.

In view of the foregoing, it will be seen that I have provided an electrical apparatus with a reactor and an efficient capacitor, which is suitable for outdoor installation. Thus, even though the capacitor has such characteristics that its capacitance will change as its temperature varies or upon the attainment of a predetermined temperature, I am able to employ such a capacitor in outdoor installation since its temperature will be controlled within a predetermined operating range by encasing the capacitors in a thermally insulated box and controlling the rate at which the reactor dielectric may circulate through the box in response to changes in temperature therein.

Although I have shown and described a particular embodiment of my invention, I do not desire to be limited to the particular embodiment described, and I intend in the appended claims to cover all modifications which do not depart from the spirit and scope of my invention.

What I claim as new and desire to secure by Letters Patent of the United States is:

1. An electrical apparatus including a reactor, a thermally insulated casing, a capacitor within said casing and having electrical connections with said reactor, a fluid dielectric for said reactor surrounding said casing, openings in said casing so disposed that said fluid may circulate through said casing in order that heat developed by said capacitor may be conducted therefrom, and means including a temperature responsive means for controlling the rate at which said fluid may circulate through said openings so that the temperature of said capacitor can be controlled within a predetermined range.

2. An electrical apparatus including a reactor, a thermally insulated casing, a capacitor within said casing and having electrical connections with said reactor, said capacitor having such characteristics that its capacitance varies with changes in temperature, a fluid dielectric for said reactor surrounding said casing, openings in said casing so disposed that said fluid may circulate through said casing in order that heat developed by said capacitor may be conducted therefrom, and means including a temperature responsive means for controlling the rate at which said fluid will circulate through said openings so that the temperature of said capacitor can be maintained above a predetermined value.

3. An electrical apparatus including a reactor, a condenser, a housing for said reactor and condenser, insulating fluid for said reactor in said housing, a thermally insulated casing within said housing and surrounding said capacitor, openings in said casing so that said fluid may circulate through said casing and remove heat therefrom, and means including a thermostat within said casing for controlling the rate at which said fluid will circulate through said openings so as to control the temperature of said capacitor within a predetermined temperature range.

4. A resonant shunt including a reactor, a thermally insulated casing, a capacitor within said casing, an insulating fluid for said reactor surrounding said casing, and means including a temperature responsive means for controlling the rate at which said fluid may circulate through said casing in order that the heat developed by said capacitor may be conducted therefrom at a predetermined rate whereby the temperature of said capacitor may be maintained above a predetermined value.

5. An electrical apparatus including an electric induction device, a thermally insulated casing, a capacitor within said casing and having electrical connections with said device, a fluid dielectric for said device surrounding said casing, openings in said casing so disposed that said fluid may circulate through said casing in order that the heat developed by said capacitor may be conducted therefrom, and means including a temperature responsive means for controlling the rate at which said fluid may circulate through said openings so that the temperature of said capacitor can be controlled within a predetermined range.

LEVIN W. FOSTER.